United States Patent Office 3,168,488
Patented Feb. 2, 1965

3,168,488
OIL-IN-WATER POLYEPOXIDE EMULSIONS
Harry J. Sommer, Lafayette, Calif., assignor to Shell Oil Company, New York, N.Y., a corporation of Delaware
No Drawing. Filed Aug. 24, 1960, Ser. No. 51,538
10 Claims. (Cl. 260—18)

This invention relates to novel aqueous emulsions and their preparation. More particularly, the invention relates to oil-in-water emulsions wherein the dispersed phase comprises a polyepoxide, a polymerized unsaturated long-chain acid and a bituminous material.

The present invention provides the means for a novel solution of an existing problem. In the production of asphalt roofing material on the basis of a fibrous material such as glass fiber it has been the practice to bond loose glass fibers into cohesive sheets by supplying a small amount of a conventional resin thereto, sufficient to tack the fibers together, and then coat the resulting mat with asphalt. The rigidity of the uncoated, plastic-bonded mats created difficulty in subsequent handling. The use of emulsions prepared according to this invention provides a method which permits glass fibers to be easily held together in a flexible mat. Although the present invention was made to provide a solution of this particular problem, it has been found that the emulsions of this invention are suitable for a great variety of other uses. They provide novel methods for laying down bituminous epoxide compositions which have greatly superior properties to conventional asphalts in a number of applications, as will be described hereinafter.

The oil phase of the novel emulsions of this invention is a composition comprising a polyepoxide, a polymerized unsaturated long-chain acid and a bituminous material. Such compositions may be referred to herein, for convenience of reference, as "bituminous epoxide compositions." They are described in detail in copending application Serial No. 730,857 of Warren C. Simpson, filed April 25, 1958 now U.S. 2,956,034. The pertinent disclosures of said copending patent application—hereinafter designated the Simpson application—are incorporated herein by reference to avoid needless repetition. The compositions are, however, described in this specification in sufficient detail to permit this invention to be readily understood.

The bituminous epoxide compositions of the Simpson application are relatively viscous, even at moderately elevated temperatures. They cannot be maintained for a substantial time at a high temperature at which they would be highly fluid, because the curing reaction takes place at such temperatures. Consequently, they are not suitable, as such, for use in the bonding of fiber glass mats described above and for numerous other uses in which it is desirable to have the bituminous epoxide composition penetrate into narrow passages, for which a highly fluid condition is required.

It is an object of this invention to provide a class of aqueous emulsions. It is a further object to provide novel, stable oil-in-water emulsions wherein the dispersed phase comprises a composite of a polyepoxide, a polymerized unsaturated long-chain acid and a bituminous material. It is a further object to provide a method for producing highly fluid composites comprising a polyepoxide, a polymerized unsaturated long-chain acid and a bituminous material. It is a further object to provide such composites having high or low viscosities, as desired. It is a further object to provide a method for applying composites comprising a polyepoxide, a polymerized unsaturated long-chain acid and a bituminous material to interstitial spaces between surfaces. It is a further object to provide emulsions comprising a polyepoxide, a polymerized unsaturated long-chain acid and a bituminous material in which the ingredients are partially precured to an optimum condition and used in that condition. It is a further object to produce such emulsions which cure to tough, flexible coatings upon evaporation of the aqueous part of the emulsion.

These and other objects of this invention can be accomplished at least in part by the novel oil-in-water emulsions of this invention wherein the dispersed phase is a composite of a polyepoxide having more than one vic-epoxy group, a polymerized unsaturated long chain acid and a bituminous material and the aqueous dispersing phase contains an emulsifying agent.

To avoid involved terminology, a simplifying convention has been adopted in discussing the emulsions of this invention. Although, as will be explained, the ingredients of the emulsions may, and usually do, undergo some reaction with one another while the emulsions are being prepared and stored, the emulsions are described as comprising: a dispersed oil phase consisting essentially of a polyepoxide, a polymerized fatty acid and a bituminous material; an aqueous dispersing phase; and an emulsifying agent. It will be understood that this description includes the products formed by reaction of the ingredients with each other during preparation and storage.

EMULSION CONSTITUENTS

Polyepoxides

The polyepoxides to be used in preparing the aqueous emulsions of the present invention are described in substantial detail in said Simpson application. Briefly, they comprise the organic compounds possessing more than one vicinal epoxy group, i.e., more than one

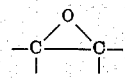

group, per molecule. These compounds may be saturated or unsaturated, aliphatic, cycloaliphatic, aromatic or heterocyclic and may be substituted with substituents such as chlorine, hydroxyl groups, ether radicals and the like. They may monomeric or polymeric.

For clarity, many of the polyepoxides and particularly those of the polymeric type are described in terms of "epoxy equivalent" values. This expression refers to the average of the number of epoxy groups per molecule. The epoxy equivalent value is obtained by dividing the average molecular weight of the polyepoxide by the epoxide equivalent weight. The epoxide equivalent weight is determined by heating a sample of the polyepoxide with an excess of pyridinium chloride dissolved in pyridine at the boiling point and then back-titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be an integer. In the case of polymeric polyepoxides the material may contain some of the monomeric epoxide or have some of the epoxy groups hydrated or otherwise reacted and/or contain macromolecules of various molecular weights. In this case the epoxy equivalent may be a fractional value and may be only slightly higher than 1. Another suitable description of the epoxide content of an epoxy compound is in terms of epoxy equivalents per 100 grams.

Detailed discussion of polyepoxides suitable for use in this invention is found in the Simpson application and in U.S. 2,633,458 to Shokal. So much of the disclosures of the Shokal patent as is relative to examples of polyepoxides is incorporated by reference into this specification.

Suitable monomeric polyepoxide compounds include diepoxidized alkadienes, diepoxidized alkenylcyclohexenes, diglycidyl ethers of dihydroxy aromatics and other polyglycidyl ethers of polyhydroxy aromatics, halo-substituted derivatives of such compounds, diepoxy ethers and the like.

Suitable polyepoxides further include the epoxidized esters of polyethylenically unsaturated monocarboxylic acids such as epoxidized natural poly-unsaturated oils. Another group are the epoxidized esters of unsaturated monohydric alcohols and polycarboxylic acids. Another group are the epoxidized esters of unsaturated alcohols and unsaturated carboxylic acids. Another group are the epoxidized derivatives of polyethylenically unsaturated polycarboxylic acids. Another group are the epoxidized polyesters obtained by reaction an unsaturated polyhydric alcohol and/or unsaturated polycarboxylic acid or anhydride. Another group are the glycidyl esters of polymerized unsaturated long-chain acids, such as dimer acids and trimer acids described hereinafter.

Examples of the polymeric polyepoxides suitable for use in the invention include the polyepoxypolyhydroxy polyethers obtained by reacting a polyhydric alcohol or polyhydric phenol with a polyepoxide.

Other polymeric polyepoxide compounds include the polymers and copolymers of the epoxy containing monomers possessing at least one polymerizable ethylenic linkage. When this type of monomer is polymerized in the substantial absence of alkaline or acidic catalyst such as in the presence of heat, oxygen, peroxy compounds, actinic light and the like, it undergoes additional polymerization at the multiple bond leaving the epoxy group uneffected. These monomers may be polymerized with themselves or with other ethylenically unsaturated monomers.

The polyepoxides that are particularly preferred for use in the compositions of this invention are the polyglycidyl ethers and particularly the polyglycidyl polyethers of polyhydric phenols and those of polyhydric alcohols. The polyglycidyl ethers of polyhydric phenols can be obtained by reacting a polyhydric phenol with an excess, e.g., 4 to 10 mole excess, of a halogen-containing epoxide in an alkaline medium.

Epihalohydrin, particularly epichlorohydrin is usually preferred as the halogen-containing epoxide. The halogen-containing epoxides are further exemplified by epibromohydrin, 3-chloro-1,2-epoxybutane, 3-bromo-1,3-epoxyhexane, 3-chloro-1,2-epoxyoctane and the like.

Polyethers A through E of Shokal, U.S. 2,633,458, are good examples of polyepoxides of the preferred type. Polyether A which contains a major proportion of 2,2-bis(2,3-epoxypropoxyphenyl)propane, is obtained by reacting p,p'-bisphenol A [2,2-bis(4-hydroxyphenyl)propane] with an excess of epichlorohydrin. Other polyhydric phenols that can be used for this purpose include resorcinol, catechol, hydroquinone, methyl resorcinol and polynuclear phenols such as 2,2-bis(hydroxyphenyl)butane, 4,4'-dihydrobenzophenone, bis(4-hydroxyphenyl)ethane and 1,5-dihydroxynaphthalene. Polyether F of the Shokal patent is a glycidyl polyether of a polyhydric alcohol. Other suitable ethers are the polyglycidyl ethers of tetrakis(hydroxyphenyl)alkanes.

The Simpson application and Shokal patent contain a large number of illustrative individual compounds of the above-described general types of suitable polyepoxides.

A special group of epoxide compounds which may sometimes be used to advantage consists of condensation products of polymerized organic acids of the type described below or of ether di- or polycarboxylic acids or anhydrides with at least 1.5 chemical equivalents of polyepoxides of the type just described. Preferably the acidic component and the polyepoxide are combined in chemical equivalent ratios from 1:2 to 1:4 to produce their condensation products. The condensation may be carried out without solvent or in solution in a hydrocarbon solvent, e.g., from 25 to 100% by weight of a solvent boiling above 100° C., the reaction taking place at a temperature between 50° C. and 200° C. and being continued until substantially all the acid has reacted, resulting in a polyepoxide condensation product. An amine catalyst may be used. Preferred reactants are the dimer or trimer acids further described below and Polyether A, supra, or a similar polyepoxide. Some condensation products of this type and their preparation are disclosed in more detail in patent application Serial No. 608,681, filed September 10, 1956, by Newey, now U.S. Patent 2,970,983.

*Polymerized organic acids*

The polymerized unsaturated long-chain acids used in the compositions of this invention are obtained by polymerizing unsaturated long-chain acids by known processes such as by the use of heat, peroxide and the like. Long-chain acids that may be used for this purpose include those containing at least 10 carbon atoms and preferably more than 14 carbon atoms.

The polymerization can be effected by utilizing the lower aliphatic esters of the unsaturated acids so as to prevent decarboxylation during the heating period and then removing the ester groups through hydrolysis. This is illustrated in Industrial and Engineering Chemistry, volume 38, page 1138 (1946). The structures of some of the polymerized acids are shown in the same journal, volume 33, page 89 (1941). The polymer acids may also be produced by other known methods.

Particularly preferred are the trimerized acids obtained from the ethylenically unsaturated fatty acids as derived from semidrying and drying oils and particularly the conjugated fatty acids containing from 12 to 20 carbon atoms. The generic structure of the resulting trimerized acids is believed to be the folowing:

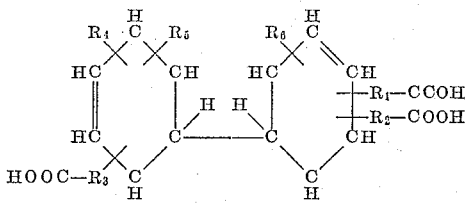

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally, the products will have the generic formula as follows:

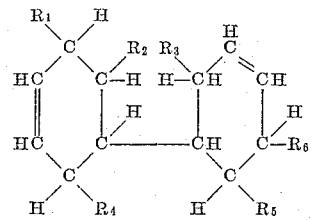

The trimer acids are generally used in admixture with varying amounts of dimer acid. Mixtures having from 5 to 95% trimer acid content may be employed. Lower trimer acid contents within this range result in greater flexibility of the ultimate cured bituminous epoxide compositions. As commercially produced, polymerized acids designated "trimer acid" usually contain a substantial proportion of the dimer and may contain some higher polymer, e.g., tetramer.

*Bituminous materials*

The bituminous materials described in the Simpson application can be used in the compositions of this invention. Briefly, they include substances containing bitumens or pyrobitumens, pyrogenous distillates and tar, pyrogenous residues (pitches and pyrogenous asphalts). They are preferably composed mainly of hydrocarbons although they may contain sulfur, nitrogen and oxygen-containing materials. They are preferably fusible and largely soluble in carbon disulfide. Examples of such bituminous materials may be found in Abraham's "Asphalts and Allied Substances," vol. I, page 57, 5th Edition.

An especially preferred group of bituminous materials to be used in this invention are the asphalts, including straight run, blown, cracked and catalytically or non-catalytically polymerized asphalts.

Preferred bituminous materials are straight run asphalts such as are used for paving, air-blown asphalts, aromatic asphalts such as the bottoms from distillation of catalytically cracked gas oils, high boiling extracts of petroleum, residual fuel oils and the like. Also preferred are products derived from coal, such as coal tars, refined coal tars, and coal tar pitches, including residuals resulting from distillation of coal tar. Such materials are described in more detail, and examples thereof given, in the above-mentioned Simpson application.

PREPARING THE BITUMINOUS EPOXIDE COMPOSITIONS

Several methods suitable for preparing bituminous epoxide compositions containing the three essential ingredients, namely polyepoxide, polymer acid and bituminous material, are described in the Simpson application. Since that application is particularly concerned with the preparation of bituminous epoxide compositions for paving and related uses, the preferred method of preparation described therein usually include the addition of aggregate, sand and the like during the preparation of the composition. It will be understood that the emulsions according to this invention generally do not contain aggregate, sand or other relatively large solid bodies.

In the preparations described in the Simpson application it is usually necessary to combine the three ingredients in some manner at an elevated temperatrue at a time immediately prior to their being laid down and cured. The compositions as a rule are liquid only at relatively high temperatures at which the curing reaction proceeds sufficiently rapidly that the useful life of the total composition is only 30 to 60 minutes at 250° F.

It is one of the advantages of the present invention that the polyepoxide, polymer acid and bituminous material can be combined and converted into an emulsion which has a long storage life prior to its application and subsequent cure. Although the composition which makes up the oil phase of the emulsion is generally prepared at an elevated temperature, required to permit the preparation of a liquid composite of uniform composition, it is thereafter promptly combined with an aqueous phase to prepare an emulsion and the emulsion is cooled, preferably to a temperature below about 80° F. and most preferably to between 32 and 42° F. At these temperatures, the present emulsions are stable and retain their usefulness for long periods.

The surprising discovery has been made that compositions can be prepared which contain the combined curable ingredients as well as an epoxide curing catalyst, such as a tertiary amine, in an aqueous emulsion which nevertheless has very long storage life. It is found that during the storage of the emulsions a partial intercondensation of the ingredients may slowly take place, but even upon prolonged storage this does not lead to a sufficient degree of condensation to prevent subsequent laying down of a surface coating and curing thereof. In fact, it has been found that particularly outstanding coatings are prepared according to this invention when an emulsion is used which does contain an amine curing agent and in which gradual precondensation has taken place during storage of the emulsion at ambient temperatures, e.g., for a period of up to 10 days or more.

Four basically different methods of preparing bituminous epoxide compositions are described in the Simpson application. These four methods are also suitable for use in preparing the oil phase of the compositions of this invention provided that the compositions are prepared without addition of sand or aggregate and that the prepared compositions are not maintained at elevated temperatures but are converted into the emulsified state and then cooled rather promptly. The four methods of preparation are as follows:

(1) The bituminous material is heated until it is a liquid, is mixed with the polymer acid and the polyepoxide added to the mixture.

(2) All three ingredients, polyepoxide, polymer acid and bituminous material are simultaneously mixed at sufficiently elevated temperatures to permit all ingredients to be in the liquid state.

(3) The three ingredients are combined without heating. This method is applicable only when the bituminous material is a liquid at about room temperature.

(4) The polymer acid and epoxide are mixed together at an elevated temperature for a certain period of time, as defined in some detail in the Simpson application, in order to effect a type of precondensation of the polymer acid and epoxide. The bituminous material is then added to the precondensate.

A still different method is suitable for use in this invention. The bituminous material is made up with up to 25% (basis total solids) of a volatile aromatic solvent such as xylene, toluene or kerosene extract. This permits converting it to a liquid state at a lower temperature than in the absence of solvent. The resulting solution is then used in the same manner as the liquefied bituminous material of Methods 1 or 2. Suitable solvents are hydrocarbon liquids in the kerosene to diesel oil boiling range, having Kauri-Butanol values of 50 or greater.

The proportions of the three components utilized in the above methods of preparation may vary within rather wide limits. For convenience, the proportions of epoxide, acid and bituminous material will be expressed as percent of the three combined ingredients, hereinafter sometimes referred to as percent of total solids. Water and emulsifying agent are not included when the relative proportions are expressed on this basis.

The polyepoxide and the polymerized acid are preferably combined in approximately chemically equivalent amounts, i.e., amounts sufficient to furnish one epoxy group for every carboxyl group. A substantial excess of either reactant may, however, be employed. The epoxy component may be present in as much as 40% excess of the stoichiometric equivalent. The excess of polymer acid may be as much as 40% over stoichiometric, referred to epoxide. In other words the stoichiometric ratio of epoxide and carboxyl groups is suitably between 1.4:1 and 1:1.4.

The proportion of the two reactive components, i.e., the polyepoxide and the polymerized acid varies from 0.5% to about 80% by weight of total solids; the proportion of bituminous material varies from 20 to 99.5% of total solids. The proportion is mainly determined by the intended use of the final product. For example, if a substantially infusible composition is desired the proportion of the combined polyepoxide and acid should be greater than about 15% and preferably at least 25% of total solids. If, on the other hand, it is desired only to increase the softening point moderately or to decrease the penetration of the asphalt to a limited extent, the presence of from 0.5% to 10% by weight of the polyepoxide and acid shows an effect on both properties. For most purposes, the preferred proportion of the combined relative components is in the range of from about 25% to about 50% and most preferably from about 30% to about 40% of the total solids, the remainder being bituminous material.

PREPARING THE EMULSIONS

Emulsions of bituminous composites have been successfully prepared, according to this invention, with use of anionic emulsifiers, cationic emulsifiers, and solid emulsifiers exemplified by bentonite clay. A great variety of emulsifying agents can be employed to prepare aqueous emulsion of the bituminous composites; however, there can be substantial differences in the quality and stability of emulsions prepared with different emulsifiers and in their utility for various application. Particularly outstanding results have been obtained with emulsions containing basic compounds which are normally curing agents for polyepoxides.

A large number of emulsifiers are known to the art. A classification and properties of emulsifiers are described briefly, for example, in Kirk-Othmer "Encyclopedia of Chemical Technology," 1950, volume 5, pages 701–703. A brief list of various types of emulsifiers is given in Table 3 on page 702 thereof. The chemistry of emulsifying agents is discussed in more detail in chaper 6 of Becher's "Emulsions: Theory and Practice," Reinhold Publishing Corp., New York, 1957. A large list of commercially available emulsifying agents is given in Appendix B of that book.

Most broadly, emplsifying agents are classified into anionic type (in which the anion is hydrophobic), cationic type (in which the cation is hydrophobic) and nonionic emulsifiers (which are completely covalent and show no apparent tendency to ionize).

Since the bituminous epoxide compositions which are the oil phase in the emulsions of the instant invention contain a fatty acid component, it is most convenient to emulsify these composites by adding them to a water phase which contains a free base that is capable of combining with a portion of the fatty acid of the oil phase, thus resulting in the formation in situ of an anionic emulsifying agent. Generally a simple base, such as an alkali metal hydroxide, e.g., sodium hydroxide or potassium hydroxide, or ammonia or a simple amine is used, which results in a hydrophilic cation and consequently in the production of an emulsifiers which is classified as of the anionic type. A wide variety of amines may be employed as discussed, for example, on pages 170–171 of Becher. The general formula of the amines is

where R, R' and R" may be hydrogen of various organic groupings.

It may sometimes be desired to employ emulsifying agents which are not dependent on the fatty acid component of the bituminous epoxide composition. In that case a variety of known emulsifiers may be employed. Included are anionic emulsifiers such as sulfated oils, e.g., Turkey-red oil or other sulfated unsaturated fatty acids, e.g., sulfated olive oil, sulfated neat's-foot oil, etc.; sulfated alcohols, e.g., the sodium salt of lauryl alcohol sulfate; alkyl polyoxyethylene sulfates of the type $$R(OC_2H_4)_nOSO_3Na$$

wherein $n$ is in the range 1 to 5; sulfated monoglycerides; alkane sulfonates such as petroleum sulfonates and compounds of the formula $RSO_2Na$ in which R is an alkyl group of 8 to 18 carbon atoms; alkyl aromatic sulfonates such as alkylated naphthalene sulfonates; and the like.

Cationic emulsifiers may also be employed in preparing emulsions according to this invention. Principally these compounds are amines or quaternary ammonium salts in which the number of carbon atoms of the amine is sufficiently large to produce hydrophobic characteristics. A typical quaternary ammonium salt is cetyl trimethyl ammonium bromide. Preferred cationic emulsifiers are those which can be employed to interreact with the fatty acid component of the bituminous epoxide composite, e.g., compounds such as diamines having the formula 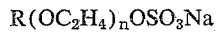 in which R represents an alkyl group derived from a fatty acid such as soya fatty acid.

Nonionic surface active emplsifying agents have in the past been found essential in the preparation of emulsions from polyepoxy polyethers. In the present invention, however, no special advantage appears to be obtained by employing nonionc surface active emulsifying agents although emulsions may be prepared with their use. Typical nonionic surface active emulsifying agents are discussed on pages 178–182 of Becher to which reference may be made for details.

Naturally occurring materials are sometimes employed as emulsifying agents. They may be used in this invention, but generally without special advantage.

Finely-divided solids are a well known group of emulsifying agents which are often separately classed. Useful emulsions according to the present invention can be prepared with the use of such solids, e.g., various clays, principally bentonite, as well as other finely divided solids such as basic metal salts, carbon black and powdered silica.

The proportion of emulsifier employed varies somewhat with the particular type of emulsifier. A number of different systems are illustrated in the following examples. In general it is desirable to have from 0.1 to 10 parts by weight of emulsifier per 100 parts of the oil phase to be emulsified; from 1 to 5 parts generally give superior results. When the emulsifier added is a base which is to interreact with a portion of the free fatty acid it is generally desirable to add a chemical equivalent of from 1 to 40% of the total fatty acid content of the bituminous epoxide composite.

The proportion of oil phase to water in the emulsion may vary in a wide range, depending on intended use. Suitable proportions are between 1:9 and 4:1. Preferred ratios are from 1:2 to 3:1.

It is sometimes advantageous to use an emulsion made by mixing two or more separate and different emulsions, each a complete emulsion according to this invention. The difference between the emulsions which are mixed may be in any one or more of the following: (1) in any one or more of the ingredients employed, i.e., in the polyepoxide, the acid, the bituminous material or the emulsifier; (2) in the proportions of ingredients in the emulsion to be mixed; (3) in the age of the emulsions. Emulsions may be mixed in any desired proportion.

Aging has an interesting effect on the emulsions of this invention. One of the characteristics of many emulsions made according to this invention is that the strength of the cured deposit which is left upon evaporation of the water and any other volatile component and subsequent curing varies with the age of the emulsion. The strength property passes through a maximum, e.g., after about 8 days storage at 77° F., at which time, typically, about 50% of the original amount of polymer acid is still present as such, as determined by electrometeric titration, the remainder of the acid being reacted with the other ingredients. Other properties of the resulting deposit also vary with age of the emulsion. The time required for cure is longer for fresh emulsion and the surface of a deposit from a fresh emulsion may remain tacky for a relatively long time whereas that from an older emulsion is less thacky and dries quickly.

Since both time and temperature effect the changes which occur during aging of emulsions, it is desirable to have an independent measure of age. A suitable means is titration of the acid content, using known methods such as electrometric titration with alcoholic KOH of a solution of the oil phase in a mixture of isopropyl alcohol and benzene.

Surprising modifications of deposits formed upon laying down the emulsion and curing the deposit have been found when similar emulsions of different ages were combined prior to use.

It has been found that deposits having superior strength and surface characteristics can be prepared by mixing two substantially similar emulsions which differ only in age. For example, 10 parts of a 12 day old emulsion (containing less than half the original acid in titratable form) mixed with 1 to 5 parts of a fresh to 1 day old emulsion (containing at least 70% of the original amount of acid in titratable form) give deposits that cure quickly and are stronger than a deposit prepared with either emulsion alone. Other proportions may be usefully employed.

The emulsions of this invention can be prepared according to methods which are further illustrated in the following examples. It has been found that it is desirable to maintain both the aqueous and oil phase at an elevated temperature sufficiently high to liquefy the oil phase while the emulsion is prepared and subsequently to cool the emulsion promptly to a relatively low temperature at least not above 80° F. and preferably between 32° and 42° F. It has been found that a particularly superior product is sometimes obtained from emulsions according to this invention when the emulsion is permitted to stand at a temperature of about 75° F. for a limited number of days, e.g., about 8 days. During this period a moderate amount of reaction takes place among the components of the emulsion, resulting in a partial pre-curing of the bituminous epoxide composite and resulting in greater strength of the film laid down upon evaporation of the emulsion and further curing of the total composite.

In a preferred embodiment, the bituminous polyepoxide composition is prepared in such a way that a substantial proportion of the polymer acid is present in unreacted form and the emulsion is prepared by mixing the liquid composite with an aqueous phase containing a water-soluble amine which may be ammonia or a primary or secondary amine but is most preferably a tertiary amine. Special advantages are sometimes obtained by using ammonia or an amine which is sufficiently volatile to evaporate together with the water when the emulsion is laid down for curing.

EXAMPLES

The following examples illustrate particular embodiments of the present invention, including the preferred embodiments. The invention is not to be interpreted as being limited by the illustrative examples, which are presented only to facilitate a better understanding thereof. Unless otherwise specified, parts and percentages in this specification are parts and percentages by weight. Polyethers identified by letters are those described in U.S. 2,633,458.

*Example 1*

A composition suitable for preparing emulsions is prepared from a liquid polyepoxide of the type described as polyether A in U.S. 2,633,458, a trimerized 9,11-octadecadienoic acid and a suitable bituminous material.

Composition I–1 is prepared by admixing 14.6 parts of polyepoxide A with a mixture of 22.9% of trimerized 9,11-octadecadienoic acid and 62.5 parts of a straight run asphalt of 85/100 penetration, held at about 100° C. The mixture is agitated for 2 to 10 minutes. The resulting liquid mixture is then emulsified as will be described in subsequent examples.

Compositions I–2, I–3, I–4 and I–5 are made by carrying out a similar mixing procedure using in place of 100 parts of polyepoxide A 70 parts, 90 parts, 110 parts and 140 parts, respectively, of the same compound.

*Example 2*

Other compositions suitable for preparing emulsions according to this invention are made by substituting for the bituminous material of Example 1 each of the following:

(1) A straight run asphalt of 200/300 penetration (compositions II–1 through II–5).

(2) A bottoms cut obtained from distillation of a catalytically cracked gas oil, having zero penetration at 77° F. and a softening point of 162° F. (III–1 through III–5).

(3) Refined coal tar (IV–1 through IV–5).

(4) An extract of a petroleum distillate having the following properties: gravity—3.3° API; flash (COC) 525° F.; viscosity—261 SUS at 210° F.; and aniline point—85° F. (V–1 through V–5).

(5) Thermally cracked residue having a softening point of 150° F., precipitation index of 71.5 and a penetration of 8 at 77° F. (VI–1 through VI–5).

(6) Petroleum residue comprising an oil-gas pitch having a softening point of 330° F., precipitation index of 91 and a penetration of zero at 77° F. (VII–1 through VII–5).

(7) A high boiling fraction of coking cycle stock (from coking Mid-Continent vacuum flasher bottoms) having a viscosity of 5,000 SSU at 77° F., an initial boiling point of 658° F., and a molecular weight of about 250 (VIII–1 through VIII–5).

(8) Coal tar pitch having a melting point of 77° F., a specific gravity of 1.25 and solubility in carbon disulfide of 86.5% (IX–1 through IX–5).

(9) A residual fuel oil having a gravity of 8.0° API; flash of 180° F. PMCC; pour point of +35° F.; viscosity of 370 cs.; 1.84% w. sulfur and 19.0% w. carbon residue (X–1 through X–5).

(10) Gilsonite, a naturally occurring asphalt (XI–1 through XI–5).

The above can be further modified by addition of up to 25 parts benzene, toluene or kerosene extract.

*Example 3*

Further compositions suitable for use in preparing emulsions of this invention are made by substituting for the trimerized 9,11-octadecadienoic acid of Example 1 each of the following:

(1) An equal molar amount of trimerized linoleic acid (compositions XII–1 through XII–5).

(2) An equal molar amount of 8,12-eicosadienedioic-1,20-acid dimer (XIII–1 through XIII–5).

(3) An equal molar amount of a mixture containing about 50% dimer acid and 50% trimer acid (XIV–1 through IV–5).

Still further modifications are obtained by combining these different fatty acids with the bituminous materials of Example 2.

*Example 4*

Further compositions suitable for preparing emulsions according to this invention are prepared by substituting for 100 parts of polyether A in Example 1, 125 parts of polyether B as described in U.S. 2,633,458. The resulting composition is referred to as composition XV–1. Compositions XV–2 through XV–5 are similarly prepared by substituting 5 parts of polyether B for 4 parts of polyether A of compositions I–2 through I–5 of Example 1.

Still further modifications are obtained by substituting 125 parts of polyether B for 100 parts of polyether A in Examples 2 and 3.

Still further modifications are obtained by substituting for 100 parts of polyether A suitable amounts of the following:

Glycidyl esters of mixed dimer acid and trimer acid;
Triglycidyl ethers of glycerine;
Polyglycidyl ethers of polyols;
Epoxidized methylcyclohexenyl methylcyclohexane carboxylate;
Condensation products of polyether A and equivalent amounts of dimerized or trimerized unsaturated fatty acids.

*Example 5*

In this and the following examples, the bituminous polyepoxide compositions prepared as described in Examples 1–4 may be for convenience referred to as "binder." This example illustrates a suitable but less preferred method for preparing emulsions according to this invention.

In this and the following examples, unless otherwise stated, the apparatus used for preparing emulsions is of homogenizer type, consisting of a gear pump and a restricting valve through which the mixture is continuously pumped as additional oil is added.

Other apparatus can also be suitable employed for preparing the emulsions according to this invention. Various types of apparatus for preparing emulsions are described in such texts as Clayton's "Emulsions and Their Technical Treatment."

To 40 parts of water there are added 1.8 parts of an ammonium soap of tall oil. To this aqueous mixture there is added with mechanical agitation 60 parts of any of compositions I–1 through XV–5. During addition the aqueous phase is at a temperature of about 200° F. and the liquid composite is held at that temperature. The agitated mixture results in a thick, stable emulsion.

By changing the amount of tall oil ammonium soap from 1.8 parts to 0.8 part under otherwise equal conditions, a much less viscous stable emulsion is prepared. With 0.3 part of soap, the emulsion is still less viscous. With 3 part of soap it is very thick.

In place of an ammonium soap of tall oil there are substituted the sodium soap of tall oil, the soap of tall oil with triethanolamine and the soap of tall oil with morpholine, respectively. Similarly stable emulsions are obtained.

In place of these soaps of tall oils, the corresponding soaps with red oil of commerce, with stearic acid of commerce and with lauric acid are substituted and stable emulsions are obtained.

Example 6

A suitable method for preparing emulsions according to this invention utilizes ammonia as the sole emulsifying agent. A stable useful emulsion is prepared, for example, by adding with mechanical agitation 60 parts of any of composites I–1 through XV–5 at a temperature of 200° F. to 40 parts of water containing 0.3 part of $NH_3$ and held at a temperature of 180° F.

Similar emulsions prepared with larger amounts of ammonia, e.g., up to 1.0 part, result in equally good emulsion. Reducing the amount of ammonia to 0.15 part results in a coarser emulsion; still lower amounts of ammonia are preferably avoided since they tend to result in unstable emulsions.

Modifying the binder content of the emulsion by adding instead of 60 parts thereof, 65 parts in one case and 70 parts in one case results in increasingly thicker emulsions. An emulsion prepared with 70 parts of binder and 30 parts of water is a paste-like material. Thinner emulsions are prepared with 50 and 55 parts of binder.

Example 7

Emulsions are prepared in a similar manner to Example 6 but substituting 5 parts of morpholine for each part of ammonia. The emulsions produced in this manner are substantially similar in appearance to emulsions produced with ammonia. The products resulting from curing these emulsions tend to be thermoplastic rather than thermosetting. Morpholine stabilized emulsions are, therefore, usually less preferred.

Example 8

Emulsions are prepared similarly to the ammonia emulsions of Example 6 but substituting for 1 part of ammonia 5–10 parts of triethanolamine. The resulting emulsions have approximately the same appearance and stability of those prepared according to Example 6.

Example 9

Emulsions are prepared in a manner similar to that of Example 6 but substituting for 1 part of ammonia 2.4 parts of sodium hydroxide. The resulting emulsions are substantially similar in appearance to emulsions prepared with ammonia.

Example 10

An emulsion is prepared employing 0.3–0.5 part of sodium dodecyl benzene sulfonate in lieu of the ammonium soap of tall oil in a preparation according to Example 5. An emulsion of satisfactory stability results.

Example 11

An emulsion is prepared from composite I–1 using bentonite as emulsifier. In order to prepare this emulsion a slurry containing 3–10% of bentonite in 50 parts of water is first made. The liquid binder composition is then gradually and carefully added unit 50 parts thereof has been added. This emulsion is stable and can be diluted with water.

Example 12

An emulsion is prepared in the manner of Example 6 utilizing as binder composition I–1 and as emulsifying agent a diamine having the formula $$RNHCH_2CH_2CH_2NH_2$$

The R represents an alkyl group derived from soya fatty acids. This diamine is sold as Duomeen-S by Armour Chemical Division. The emulsion is prepared by adding 1.8 parts of the diamine to 60 parts of the binder. This mixture is then gradually added to 40 parts of water containing 1.4 times the stoichiometric equivalent of acetic acid based on the diamine. A stable emulsion results.

A stable emulsion is also prepared when both the diamine and the acetic acid are placed in the aqueous phase.

Similarly stable emulsions are obtained when substituting composites I–2 through XV–5 for I–1.

Example 13

An emulsion is prepared in the manner of Example 12 but adding to the aqueous phase in addition to the other components 1.2 parts of an ethoxylated long chain fatty acid amine having 15 ethylene oxide groups per molecule. This addition further stabilizes the resulting emulsion.

In lieu of the above described compound there is substituted the corresponding compound having two ethylene oxide groups per molecule, with similar results.

Example 14

All of the above emulsions are prepared by adding the oil phase into an excess of the aqueous phase. Emulsions according to this invention can also be successfully prepared by the inversion technique. For example, 60 parts of composition I–1 are heated to 200° F. and placed in the mixing vessel of a paddle mixer operating at slow speed. 40 parts of water containing 0.64–2.4 parts of triethanolamine are heated to 190° F. and slowly added to the bituminous epoxide composition. The result, on initial addition of water, is a water-in-oil emulsion which during the course of water addition becomes inverted and becomes the desired oil-in-water emulsion. The resulting emulsion is cooled. If desired it can then be passed through a colloid mill to further stabilize it by converting the oil droplet to a substantially uniform size.

Example 15

An emulsion is prepared according to Example 8, employing as binder composition I–1 and employing as emulsifier 0.64 part of triethanolamine in 40 parts of water. This is a chemical equivalent of 10% of the trimer acid present in the binder composition. The emulsion, after preparation, is stored at 73° F. At intervals of 1, 2, 3, 8, 10 and 30 days after the original preparation, portions of the emulsion are poured on clean tin plates at room temperature and placed in an oven held at 140° F. for 4 days to be cured. The resulting tough, flexible films adhere tenaciously to the tin plates but can be removed by dissolving the tin by means of mercury.

The films are removed and tested for tensile strength and percent elongation at break with the following results.

| Days of storage of emulsion | Tensile Strength, p.s.i. | Percent Elongation at Break |
|---|---|---|
| 1 | 475 | 135 |
| 2 | 570 | 165 |
| 3 | 635 | 195 |
| 8 | 765 | 210 |
| 10 | 665 | 190 |
| 30 | 551 | 179 |

Films prepared from the emulsion without storage have an approximate tensile strength of 400 p.s.i. and elongation of 100%. It is thus seen that although the toughness and flexibility of the films prepared from this emulsion are satisfactory even when immediately prepared, there appears to be a reaction taking place within the emulsion during storage which results in a substantial increase in the tensile strength and flexibility of films prepared from such emulsions, reaching in this particular instance a maximum after about 8 days of storage and decreasing thereafter.

Similar results are obtained with other emulsions prepared according to Examples 5 through 14. The ingredients used in preparing the emulsions do, of course, affect the results to some extent. For example, films made from the emulsions of Example 6, using ammonia as sole emulsifier, tend to be relatively stiff and hard, those from the emulsion of Example 8, using triethanolamine are more flexible and rubbery, those from emulsions of Example 7, using morpholine, are thermoplastic while the others tend to be infusible.

*Example 16*

In the production of asphalt roofing material from glass fiber, a matting of glass fiber is deposited from an aqueous dispersion in a manner known to the art and emerges from the rolls as a wet flexible sheet. It is flooded with an aqueous emulsion of binder composition I-1, prepared according to Example 6, in sufficient amount to deposit about 14% of binder. The resulting material passes through a drying oven. The dry sheet is held together firmly by the small amount of the resulting cured bituminous epoxide composition. It is then coated with asphalt to prepare the finished roofing material.

*Example 17*

In the preparation of a pavement, an emulsion is prepared in accordance with Example 8, employing as binder composition I-1 and as emulsifier 2.1 parts of triethanol amine per 100 parts binder, chemically equivalent to 20% of the trimer acid in the binder. 11.7 parts of the cold emulsion are added to the 100 parts of graded mineral aggregate which is at a temperature of 275° F. The mixture is mixed in a pug mill. The resulting mix, having a temperature of 200° F. is kept at 200° F. for 1 hour. The composite is then laid down as a pavement, resulting in pavement which is greatly superior to ordinary asphalt pavement prepared in similar manner. A portion of the hot mixture is converted into a simulated pavement by the Marshall test method (ASTM D1559-58T) and cured at 140° F. The pavement has a Marshall stability at 140° F. of 8600 pounds and flow of 0.22 inch of which only 0.12 inch is permanent flow.

USES OF THE EMULSIONS

Several uses of the emulsions of this invention have already been described, including their use in producing mats of fibrous materials sufficiently bonded to provide flexible mats for subsequent handling and their use in the preparation of a pavement by adding the emulsion to hot aggregate. The following is a partial list of other uses of these emulsions.

The use of the emulsion to prepare tough, flexible, cured film has also been described. It will be apparent that the emulsion can be applied to metallic and non-metallic surfaces which are subsequently heated to cure the emulsion, e.g., to a temperature of 140° F. for a period of ½ hour to 4 days, depending on the degree of cure that has taken place in the emulsion, resulting in a tough adherent chemically resistant coating of the surface. A particular advantage of the coatings laid down from emulsions according to this invention is that the coatings are resistant to corrosion. They may be employed, for example, to protect ferrous metal structures against sea water corrosion as in offshore drilling platforms.

The emulsions of this invention can be applied to paper to provide a water-proofed paper.

The emulsions can be used to apply a thin coat of bituminous epoxide coating to an asphalt or concrete base upon which it is desired to lay down a heavier coating of the type described in the Simpson application. Use of the emulsions of this invention provides the advantage that the underlying concrete or asphalt surface need not be cleaned prior to application of the tack coat.

The emulsions can also be employed as crack fillers in roads. In this case, a fine sand or mineral aggregate is added to the emulsion prior to its use in filling the cracks.

The emulsions of this invention can be used in lieu of hot asphalt in the production of roofing materials. In this case it is often desirable to add a thixotropic agent such as bentonite or calcium aluminum silicate to the emulsion to produce a relatively non-flowing liquid coat which is subsequently cured.

I claim as my invention:
1. An oil-in-water emulsion consisting of
(A) 100 parts by weight of a dispersed phase consisting essentially of a homogeneous bituminous epoxide composition resulting from admixing in the liquid state
(1) a poly-vic-epoxide which is curable to a polyepoxide resin through its epoxide end groups;
(2) a polymerized drying oil fatty acid; and
(3) 20 to 99.5 parts by weight of a fusible bituminous material;
said components (1) and (2) being present in the total amount of 0.5 to 80 parts by weight, the stoichiometric epoxide to carboxyl group ratio being between 1.4:1 and 1:1.4; and
(B) at least 25 parts by weight of an aqueous dispersing phase consisting predominantly of water;
said emulsion comprising an emulsifying agent generated by reaction between said bituminous epoxide composition and 0.1 to 10 parts by weight of a base selected from the group consisting of ammonia, alkali metal hydroxides, and amines capable of neutralizing fatty acids, originally contained in said aqueous phase.
2. An emulsion according to claim 1 in which said emulsifying agent is a tertiary amine.
3. An emulsion according to claim 2 in which said tertiary amine is triethanol amine.
4. An emulsion according to claim 1 in which said polyepoxide is a glycidyl ether of a polyhydric phenol, having a molecular weight between 200 and 900.
5. An emulsion according to claim 1 in which said polyepoxide is a glycidyl polyether of 2,2-bis(4-hydroxyphenyl)propane.
6. An emulsion according to claim 1 in which said polymerized unsaturated long chain acid is trimerized fatty acid.
7. An emulsion according to claim 1 in which said bituminous material is an asphalt.
8. An oil-in-water emulsion consisting of
(A) 100 parts by weight of a dispersed phase consisting essentially of a homogeneous bituminous epoxide composition resulting from admixing in the liquid state
- (1) a polyglycidyl polyether reaction product of 2,2-bis(4-hydroxyphenyl)propane and epichlorohydrin;
- (2) polymer of 2 to 3 molecules of conjugated unsaturated fatty acids of 12 to 20 carbon atoms per molecule; and
- (3) 20 to 99.5 parts by weight of fusible asphalt; said components (1) and (2) being present in the total amount of 0.5 to 80 parts by weight, the stoichiometric epoxide to carboxyl group ratio being between 1.4:1 and 1:1.4; and
- (B) an aqueous dispersing phase consisting predominantly of 25 to 900 parts by weight of water; said emulsion comprising an emulsifying agent generated by reaction between said bituminous epoxide composition and 0.1 to 10 parts by weight of ammonia originally contained in said aqueous phase.

9. A process for preparing a bituminous coating which comprises combining at least two separate emulsions, each consisting of a composition as defined in claim 8 and differing essentially from the other in the amount of interreaction between ingredients, and depositing the resulting emulsion on a surface under conditions at which water evaporates from the emulsion and a cured deposit results.

10. A process according to claim 9 in which said emulsions which are mixed differ in that one emulsion is relatively fresh and contains in titrable form at least 70% of the acid originally present and the other is older and contains in titrable form less than half the acid originally present.

References Cited by the Examiner
UNITED STATES PATENTS

| | | | |
|---|---|---|---|
| 2,872,427 | 2/59 | Schroder | 260—29.2 |
| 2,956,034 | 10/60 | Simpson | 260—18 |
| 2,965,590 | 12/60 | Schumacher et al. | 260—18 |

LEON J. BERCOVITZ, *Primary Examiner.*

A. D. SULLIVAN, MILTON STERMAN, *Examiners.*